(12) United States Patent
Dasgupta et al.

(10) Patent No.: US 10,931,217 B2
(45) Date of Patent: Feb. 23, 2021

(54) POWER SYSTEM

(71) Applicants: ROLLS-ROYCE plc, London (GB); MTU FRIEDRICHSHAFEN GMBH, Friedrichshafen (DE); MTU ONSITE ENERGY GMBH, Augsburg (DE)

(72) Inventors: Souvik Dasgupta, Singapore (SG); Johannes Demharter, Friedrichshafen (DE); Michael Kreissl, Friedberg (DE); Yang Shicong, Singapore (SG); Amit K Gupta, Singapore (SG)

(73) Assignees: ROLLS-ROYCE PLC, London (GB); MTU FRIEDRICHSHAFEN GMBH, Friedrichshafen (DE); MTU ONSITE ENERGY GMBH, Augsburg (DE)

(*) Notice: Subject to any disclaimer, the term of this patent is extended or adjusted under 35 U.S.C. 154(b) by 80 days.

(21) Appl. No.: 16/401,543

(22) Filed: May 2, 2019

(65) Prior Publication Data
US 2019/0372493 A1  Dec. 5, 2019

(30) Foreign Application Priority Data

May 30, 2018 (GB) .................................. 1808797.3

(51) Int. Cl.
*H02P 9/00* (2006.01)
*G01D 5/242* (2006.01)

(52) U.S. Cl.
CPC ............ *H02P 9/009* (2013.01); *G01D 5/242* (2013.01)

(58) Field of Classification Search
CPC .......... H02P 9/009; H02P 9/006; H02P 21/18; G01D 5/242

USPC ........................ 324/71.1, 693, 600, 649, 691
See application file for complete search history.

(56) References Cited

U.S. PATENT DOCUMENTS

| 4,467,267 A | 8/1984 | Hucker et al. |
| 4,772,802 A | 9/1988 | Glennon et al. |
| 4,868,406 A | 9/1989 | Glennon et al. |
| 4,994,684 A | 2/1991 | Lauw et al. |
| 5,013,929 A | 5/1991 | Dhyanchand |
| 5,015,941 A | 5/1991 | Dhyanchand |
| 5,068,590 A | 11/1991 | Glennon et al. |
| 5,140,245 A | 8/1992 | Stacey |
| 5,384,527 A | 1/1995 | Rozman et al. |

(Continued)

FOREIGN PATENT DOCUMENTS

| GB | 2519116 A | 4/2015 |
| WO | 2008/102105 A1 | 8/2008 |

(Continued)

OTHER PUBLICATIONS

Aug. 23, 2019 Search Report issued in European Patent Application No. 19171872.

(Continued)

*Primary Examiner* — Giovanni Astacio-Oquendo
(74) *Attorney, Agent, or Firm* — Oliff PLC

(57) ABSTRACT

A power system, including: a synchronous electrical generator having a rotor; and an angle computation unit configured to: determine a rotor angle in a steady state period of the synchronous electrical generator, determine a change in rotor angle in a transient period of the synchronous electrical generator, and estimate the rotor angle in the transient period based on the steady state rotor angle and the change in rotor angle.

13 Claims, 5 Drawing Sheets

(56) References Cited

U.S. PATENT DOCUMENTS

| | | | |
|---|---|---|---|
| 5,418,446 | A | 5/1995 | Hallidy |
| 5,430,362 | A | 7/1995 | Carr et al. |
| 5,461,293 | A | 10/1995 | Rozman et al. |
| 5,493,200 | A | 2/1996 | Rozman et al. |
| 5,495,162 | A | 2/1996 | Rozman et al. |
| 5,495,163 | A | 2/1996 | Rozman et al. |
| 6,172,498 | B1 | 1/2001 | Schmidt et al. |
| 6,617,972 | B2 * | 9/2003 | Takarada ............ G08B 21/0484 340/635 |
| 7,301,310 | B2 | 11/2007 | Ganev et al. |
| 7,821,145 | B2 | 10/2010 | Huang et al. |
| 7,843,175 | B2 | 11/2010 | Jakeman et al. |
| 8,278,883 | B2 | 10/2012 | Dalby |
| 8,593,095 | B2 | 11/2013 | Markunas et al. |
| 8,779,729 | B2 * | 7/2014 | Shiraishi .............. G01R 31/382 320/155 |
| 10,205,415 | B2 | 2/2019 | Blackwelder et al. |
| 2002/0093360 | A1 * | 7/2002 | Nagata ............... G01R 31/2884 361/86 |
| 2005/0216225 | A1 | 9/2005 | Anghel et al. |
| 2007/0188184 | A1 * | 8/2007 | Athas ................. G01R 31/3004 324/750.3 |
| 2007/0222220 | A1 | 9/2007 | Huang et al. |
| 2009/0174188 | A1 | 7/2009 | Huang et al. |
| 2010/0039077 | A1 | 2/2010 | Dalby |
| 2012/0050053 | A1 | 3/2012 | Kim |
| 2012/0098518 | A1 * | 4/2012 | Unagami ............. G01R 22/066 324/74 |
| 2013/0238273 | A1 * | 9/2013 | Tercariol ............. H01L 29/7808 702/117 |
| 2014/0032138 | A1 | 1/2014 | Shrestha et al. |
| 2016/0357207 | A1 | 12/2016 | Desabhatla |
| 2017/0170764 | A1 | 6/2017 | Blackwelder et al. |
| 2017/0176222 | A1 | 6/2017 | Hosseini Dastjerdi et al. |
| 2018/0102725 | A1 | 4/2018 | Fahringer et al. |
| 2019/0173403 | A1 | 6/2019 | Blackwelder et al. |
| 2019/0288624 | A1 | 9/2019 | Gupta et al. |
| 2019/0305703 | A1 | 10/2019 | Holliday et al. |

FOREIGN PATENT DOCUMENTS

| | | |
|---|---|---|
| WO | 2011/070520 A2 | 6/2011 |
| WO | 2013/102849 A2 | 7/2013 |
| WO | 2017/214499 A1 | 12/2017 |

OTHER PUBLICATIONS

Nov. 20, 2018 Search Report issued in British Patent Application No. 1808797.3.
Nov. 23, 2018 Search Report issued in British Patent Application No. 1808798.1.
Nov. 15, 2018 Search Report issued in British Patent Application No. 1808796.5.
IEEE Tutorial on the Protection of Synchronous Generators (second edition), Aug. 29, 2011, URL: <http://resourcecenter.ieee-pes.org/pes/product/tutorials/PESTP1001>.
Tomislav Idzotic et al. "Synchronous Generator Load Angle Measurement and Estimation". Automatika, vol. 45, No. 3-4, 2004, pp. 179-186.
D. Sumina et al. "Determination of Load Angle for Salient-Pole Synchronous Machine". Measurement Science Review, vol. 10, No. 3, 2010, pp. 89-96.
U.S. Appl. No. 16/401,570, filed May 2, 2019 in the name of Yang Shicong et al.
U.S. Appl. No. 16/401,638, filed May 2, 2019 in the name of Johannes Demharter et al.
Aug. 30, 2019 Search Report issued in European Patent Application No. 19171872.5.
May 6, 2020 Notice of Allowance issued in U.S. Appl. No. 16/401,570.
Sep. 2, 2019 Extended Search Report issued in European Patent Application No. 19171871.7.
Oct. 7, 2019 Extended Search Report issued in European Patent Application No. 19171873.3.
Jan Turcek et al. "Estimation of Load Angle Using Measured Parameters of Synchronous Machine". Elektro, 2012, IEEE, May 21, 2012, pp. 270-273.
Dec. 31, 2020 Office Action issued in U.S. Appl. No. 16/401,638.

* cited by examiner

POWER SYSTEM

The present disclosure relates to the determination of a load angle and/or rotor angle in an electrical power generator driven by prime mover, such as a reciprocating engine or gas/steam/wind turbine or motor etc. for a power grid application. The techniques disclosed herein provide accurate determination of the load angle and/or rotor angle during high load conditions and also during transient periods when a fault has caused magnetic saturation of the generator. The techniques disclosed herein are therefore particularly appropriate for detecting when an out-of-step condition has occurred.

There is a general need to improve known load angle and/or rotor angle determination techniques.

According to a first aspect of the present invention there is provided a power system, comprising: a synchronous electrical generator having a rotor; and an angle computation unit configured to: determine a rotor angle in a steady state period of the synchronous electrical generator, determine a change in rotor angle in a transient period of the synchronous electrical generator, and estimate the rotor angle in the transient period based on the steady state rotor angle and the change in rotor angle. This approach provides a cheap and reliable way of determining the rotor angle even in a transient period, e.g. following a fault.

The angle computation unit can be configured to estimate a load angle in the transient period based on the estimated rotor angle and the difference between a voltage angle at an output terminal of the synchronous electrical generator and a voltage angle at the point of common coupling to a load attached to the synchronous electrical generator. This approach provides a cheap and reliable way of determining the load angle even in a transient period.

The power system can comprise a PCC voltage sensor configured to measure a voltage at the point of common coupling. The angle computation unit can be configured to receive a three phase voltage from the PCC voltage sensor, and determine the voltage angle at the point of common coupling.

The angle computation unit can comprise a sample and hold circuit configured to sample the steady state rotor angle and hold its value for the transient period. The angle computation unit can comprise a trigger circuit configured to output control signals to the sample and hold circuit based on a rate of change of an angular speed of the rotor.

According to a second aspect of the present invention there is provided a power system, comprising: a synchronous electrical generator having a rotor and an output terminal; and an angle computation unit configured to: determine a load angle in a steady state period of the synchronous electrical generator, determine a change in rotor angle in a transient period of the synchronous electrical generator, and estimate a load angle in the transient period based on the change in rotor angle, the steady state load angle and a voltage angle at the output terminal. This approach provides a cheap and reliable way of determining the load angle even in a transient period.

The angle computation unit can be configured to: estimate an internal voltage angle of the synchronous electrical generator in the transient period based on the steady state load angle and the voltage angle at the output terminal, and estimate the load angle in the transient period by determining a difference between the estimated internal voltage angle and the voltage angle at the output terminal. The angle computation unit can be configured to estimate the internal voltage angle based on a held value of the internal voltage angle from when the transient period started and a gradient of the voltage angle at the output terminal when the transient period started.

The power system can comprise: a terminal voltage sensor configured to measure a voltage at the output terminal, wherein the angle computation unit is configured to receive a three phase voltage from the terminal voltage sensor, and determine the voltage angle at the output terminal.

The angle computation unit can be configured to determine the change in rotor angle by time integrating differences between an angular speed of the rotor and a reference angular speed. The power system can comprise: a prime mover, for example, a reciprocating engine or gas/steam/wind turbine or a motor etc. configured to drive the synchronous electrical generator, wherein the angle computation unit comprises a generator speed estimator configured to estimate the angular speed of the rotor based on an angular speed of the prime mover.

The electrical power output from the synchronous electrical generator can be less than 30 MW. However the applicability of the proposed methods is not limited for this power range only.

According to a third aspect of the present invention there is provided a method of determining a rotor angle in a power system comprising a synchronous electrical generator, the method comprising: determining a rotor angle in a steady state period of the synchronous electrical generator, determining a change in rotor angle in a transient period of the synchronous electrical generator, and estimating the rotor angle in the transient period based on the steady state rotor angle and the change in rotor angle.

According to a fourth aspect of the present invention there is provided a method of determining a load angle in a power system comprising a synchronous electrical generator, the method comprising: determining a load angle in a steady state period of the synchronous electrical generator, determining a change in rotor angle in a transient period of the synchronous electrical generator, and estimating a load angle in the transient period based on the change in rotor angle, the steady state load angle and a voltage angle at an output terminal of the synchronous electrical generator.

The power system in the third or fourth aspect can be a power system according to the first or second aspect.

According to a fifth aspect of the present invention there is provided a method of determining whether or not an out-of-step condition has occurred, the method comprising: determining a rotor angle or a load angle in a power system according to the method of the third or fourth aspect; and determining whether or not an out-of-step condition has occurred depending upon the determined rotor angle and/or load angle.

According to a sixth aspect of the present invention there is provided a computer program that, when executed by a computing device, causes the computing device to determine a rotor angle or a load angle in a power system according to the method of the third or fourth aspect and/or an out-of-step condition according to the method of the fifth aspect.

According to a seventh aspect of the present invention there is provided a computing device configured to determine a rotor angle and/or a load angle in a power system and/or an out-of-step condition by executing the computer program of the sixth aspect.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
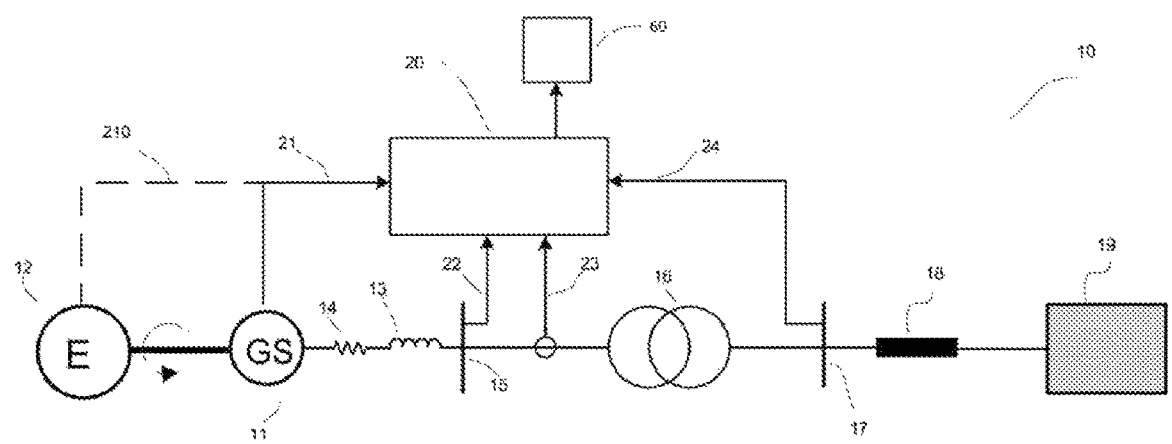
FIG. 1 shows the components of a power system according to an embodiment.

The present disclosure provides an improved method of determining the load angle and/or rotor angle in an electrical power generator for a power grid.

In order to clearly present the context of the present disclosure, details of background technology are provided below.

Electrical power systems are exposed to a variety of abnormal operating conditions such as faults, generator loss, line tripping, and other disturbances that can result in power oscillations and consequent system instability. Under these conditions, appropriate relay settings are essential to ensure proper protection (i.e., the disconnection of generators that lose synchronism and the blocking of undesired operation of distance relays associated with high-voltage, HV, lines).

During normal operating conditions, the electric power output from a generator produces an electric torque that balances the mechanical torque applied to the generator rotor shaft. The rotor runs at a constant speed with the electric and mechanical torques balanced. When a fault occurs and the amount of power transferred is reduced, this thereby reduces the electric torque that counters the mechanical torque. If the mechanical power is not reduced during the fault, the generator rotor will accelerate due to the unbalanced torque condition. In some situations, the amount of power transferred can be increased (instead of reduced) depending on fault type and level.

During an unstable power condition, at least two generators that provide power to a power grid rotate at different speeds to each other and lose synchronisation. This is referred to as an out-of-step condition (also referred to as a loss-of-synchronism condition or an out-of-synchronous condition).

An out-of-step condition causes high currents and mechanical forces in the generator windings and high levels of transient shaft torques. The torques can be large enough to break the shaft of a generator. Pole slipping events can also result in abnormally high stator core end iron fluxes that can lead to overheating and shorting at the stator core ends. The unit transformer will also be subjected to very high transient winding currents that impose high mechanical stresses on the windings.

Accordingly, if an out-of-step condition occurs, it is important that the generator or system areas operating asynchronously are quickly isolated from each other using out-of-step protection techniques.

Out-of-step protection is described in detail in at least: IEEE Tutorial on the Protection of Synchronous Generators (second edition), posted on 29 Aug. 2011, see http://resourcecenter.ieee-pes.org/pes/product/tutorials/PESTP1001 (as viewed on 14 Mar. 2018).

For a large power generation system, it is standard for an out-of-step detector, such as an impedance relay, to be used to determine if the generator is correctly synchronised with the power grid. However, out of step detectors are not normally provided for small synchronous generators, i.e. generators with a power output of less than 30 MW.

A particularly appropriate application for small synchronous generators is in smart grids. These are power grids with a variable number of power sources and adaptable power output from the power sources. Another particularly appropriate application for small synchronous generators is in micro grids. It is therefore desirable for small synchronous generators to be provided with out-of-step protection at a much lower cost than the out-of-step detection and prevention techniques that are currently used with large power generation systems.

A way of determining if a generator is operating correctly, or if an out-of-step condition has, or is about to, occur, is by determining and monitoring the rotor angle and/or load angle of the generator. An accurate and low cost technique for determining the rotor angle and/or load angle of a generator is therefore desired.

A known and low cost technique for estimating the load angle of a generator is disclosed in D. Sumina, "Synchronous Generator Load Angle Measurement and Estimation", AUTOMATIKA 45 (2004) 3-4, 179-186. This technique allows the load angle to be estimated from the measured output voltages and currents. However, the estimation of the load angle is dependent on reactances in the system. This technique is therefore not accurate during higher loading condition when the high current causes magnetic saturation in the generator core. Accordingly, this technique is only suitable for the estimation of load angle when the system is in steady state operation and it cannot be used to estimate the load angle during the transient period for out-of-synchronous protection. In addition, the accuracy of this technique also decreases when there is a change in saturation in the alternator core due to a variation of the power required to a load.

Another known technique for estimating the load angle of a generator is disclosed in D. Sumina, "Determination of Load Angle for Salient-pole Synchronous Machine", MEASUREMENT SCIENCE REVIEW, Volume 10, No. 3, 2010. The load angle is measured using an optical encoder and digital control system.

Disadvantages of this technique include the need for the additional components of an optical encoder and sensor. This increases costs and the modification of an existing generator is required in order for the additional components to be installed. A no-load angle calibration is also required after each synchronisation.

The present disclosure provides a new method of determining a load angle and/or rotor angle in a synchronous electrical power generator for a power grid.

The disclosed technique differs from known techniques by continuously monitoring the change in rotor angle. When the power system is in a steady state condition, the change in rotor angle is about zero. In a transient period (e.g. after a fault), the change in rotor angle can be combined with a held value of another property (e.g. the rotor angle or generator output voltage) from when the transient period started so as to estimate the rotor angle and/or a load angle.

Advantages include accurate determination of the load angle and/or rotor angle both during steady state operation, during the transient period for out-of-synchronous protection and/or under high load conditions. In addition, the disclosed technique can be implemented at a low cost because there is no need for additional components such as an optical encoder and sensor. Further, the angle estimation can be switched seamlessly between the steady state and transient conditions.

FIG. 1 shows a power system 10 according to an embodiment.

The power system 10 comprises a prime mover 12 that may, for example, be a diesel engine.

In the description below, an engine is provided as an example of the prime mover. The power system 10 also comprises a synchronous electric generator 11 that has an output terminal 15, a unit transformer 16 and a point of common coupling (PCC) terminal 17 at a point of common coupling. The unit transformer 16 is provided between the output terminal 15 of the generator 11 and the PCC terminal 17. The engine 12 has a shaft that is arranged to drive the generator 11 so that the generator 11 generates electrical power that is output from the output terminal 15, through the unit transformer 16, through the PCC terminal 17 and out of the power system 10. The electrical power may be supplied to a transmission line 18 that supplies the electrical power to a power grid 19. These components of the power system 10, and operation of the power system 10, may be the same as for known power systems.

Figure 2:
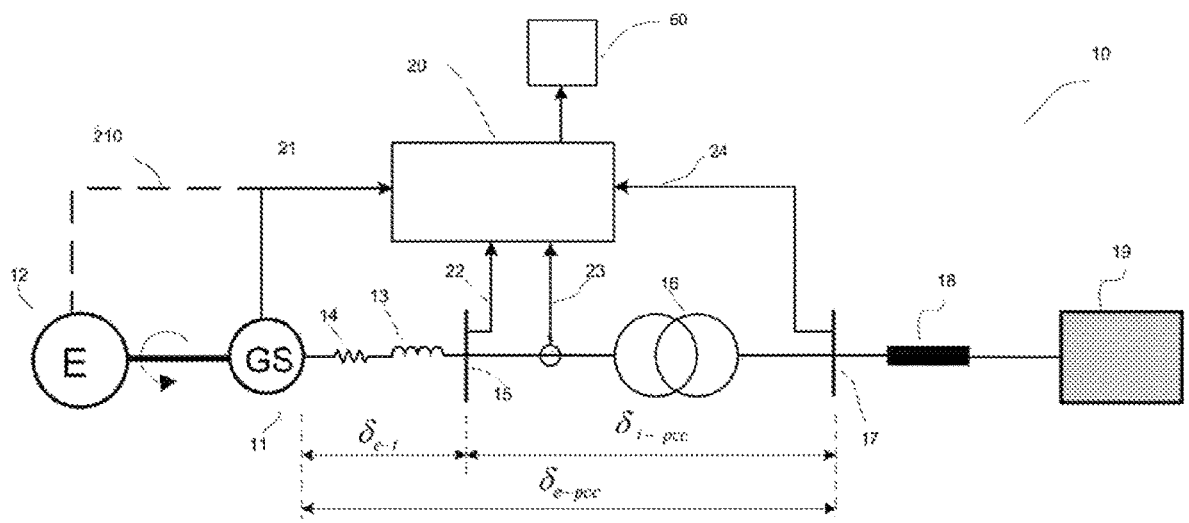
FIG. 2 shows the components of a power system according to an embodiment.

As illustrated in FIG. 2, the load angle $\delta_{e-t}$ (also referred to as power angle) is defined herein as the angular difference between the open circuit voltage of the generator 11 (also referred to as the open circuit armature voltage, no load voltage, emf, back emf, induced emf or internal voltage of the generator 11) and the voltage at the output terminal 15 of the generator 11.

The rotor angle (also referred to as rotor internal angle) is defined herein as the angular difference between the open circuit voltage of the generator 11 (also referred to as the open circuit armature voltage, no load voltage, emf, back emf, induced emf or internal voltage of the generator 11) and the voltage at the PCC terminal 17.

By monitoring only the load angle, only the rotor angle or both the load and rotor angle, the performance of the power system 10 can be determined and an out-of-step condition detected.

The power system 10 can further comprise one or more of a field current sensor 21 in the generator 11 for measuring the field current, an output voltage sensor 22 for measuring the voltage at the output terminal 15 of the generator 11, i.e. the generator output voltage, a terminal current sensor 23 for measuring the current at the terminal 15 of the generator 11, i.e. the generator terminal current, and a PCC voltage sensor 24 for measuring the voltage at the PCC 17, i.e. the PCC voltage.

Also shown in FIG. 1 are a resistor 14 and an inductor 13. These respectively represent the internal resistance and reactance of the generator 11.

The power system 10 comprises an angle computation unit 20. The angle computation unit 20 is configured to determine a rotor angle $\delta_{e-pcc,ss}$ in a steady state period of the generator 11. In the steady state condition, the rotor angle $\delta_{e-pcc,ss}$ can be determined using known methods. For example, the rotor angle $\delta_{e-pcc,ss}$ can be computed as the sum of the load angle $\delta_{e-t,ss}$ of the generator and the voltage angle difference $\delta_{t-pcc,ss}$ between the output terminal 15 and the PCC terminal 17. In the steady state, these angles are considered to be constant.

The angle computation unit 20 is configured to determine a change in rotor angle $\Delta\delta$ in a transient period of the generator 11. In steady state, the change of the rotor angle $\Delta\delta$ is about zero. However, during a transient period, the change of the rotor angle $\Delta\delta$ can be non-zero, due to the imbalance explained above. The angle computation unit 20 is configured to estimate the rotor angle $\delta$ in the transient period based on the steady state rotor angle $\delta_{e-pcc,ss}$ and the change in rotor angle $\Delta\delta$.

When a fault occurs in the generator 11 or more generally in the power system 10, the parameters used to compute the steady state rotor angle $\delta_{e-pcc,ss}$ are no longer valid. The steady state rotor angle $\delta_{e-pcc,ss}$ (i.e. the rotor angle when the steady state period ends and the transient period begins) can be held and the held value can remain constant throughout the transient period. The rotor angle $\delta$ in the transient period can be calculated as the sum of the steady state rotor angle $\delta_{e-pcc,ss}$ and the change of the rotor angle $\Delta\delta$.

After the transient period of the fault is over, the held value for the steady state rotor angle $\delta_{e-pcc,ss}$ can be released and the rotor angle can be determined using the parameters that are valid again in the new steady state period. During the steady state period, the change of the rotor angle $\Delta\delta$ is about zero, such that summing the change of the rotor angle $\Delta\delta$ and the calculated steady state rotor angle $\delta_{e-pcc,ss}$ simply results in the calculated steady state rotor angle $\delta_{e-pcc,ss}$, (i.e. in the steady state, $\delta \approx \delta_{e-pcc,ss}$).

Figure 3:
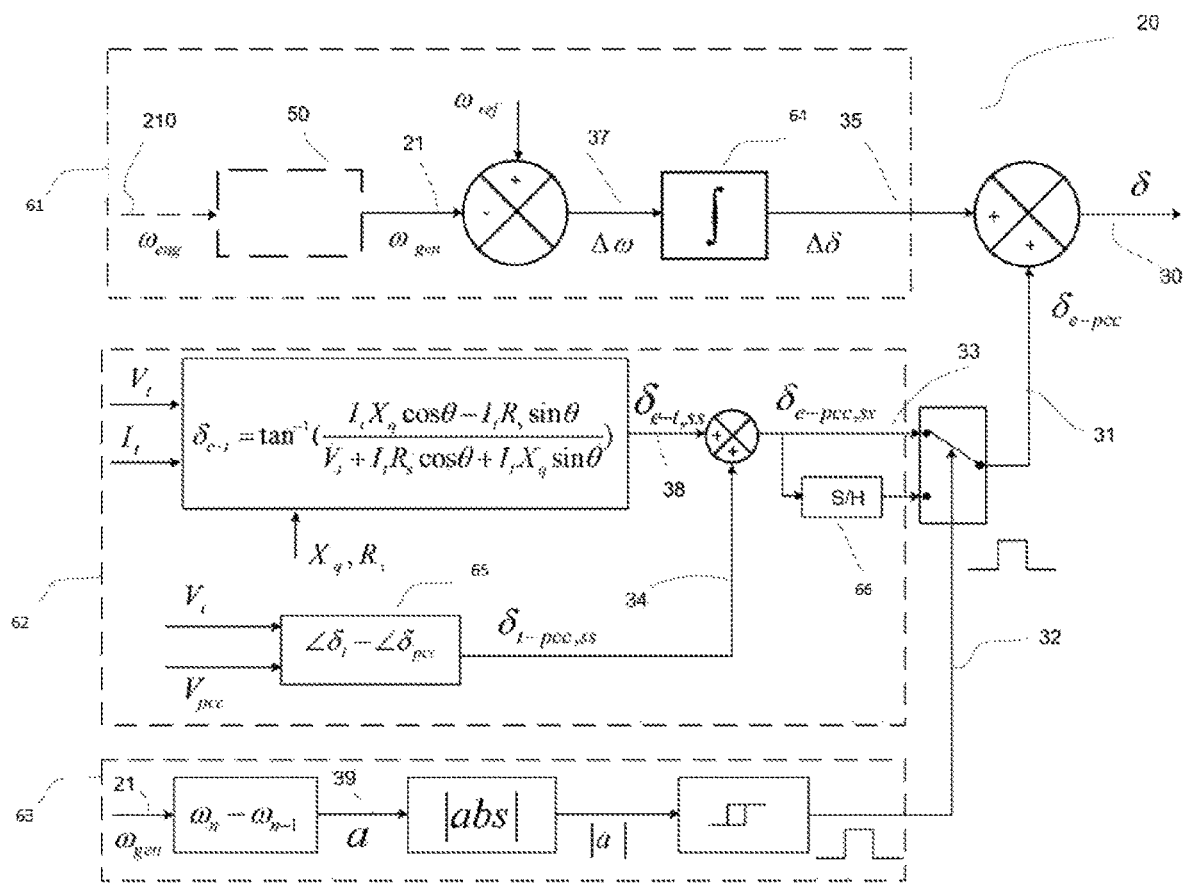
FIG. 3 shows how a rotor angle can be estimated according to an embodiment.

FIG. 3 is a schematic diagram showing the functions of the angle computation unit 20. As shown in FIG. 3, the angle computation unit 20 can comprise a rotor angle change module 61 configured to determine the change in rotor angle $\Delta\delta$. The rotor angle change module 61 is configured to determine the change in rotor angle $\Delta\delta$ by time integrating differences between an angular speed of the rotor $\omega_{gen}$ and a reference angular speed $\omega_{ref}$. For example, the reference angular speed $\omega_{ref}$ may be the preceding calculated angular speed of the rotor $\omega_{gen}$. As shown in FIG. 3, a generator speed signal 21 is compared to the reference angular speed $\omega_{ref}$ so as to determine the difference between the angular speed of the rotor $\omega_{gen}$ and the reference angular speed $\omega_{ref}$. This may be termed the change of generator speed $\Delta\omega$.

The change of generator speed signal 37 is input into an integrator 64 of the rotor angle change module 61. The integrator 64 time integrates the change of generator speed signal 37 so as to determine the change in rotor angle $\Delta\delta$. The rotor angle change module 61 is configured to output a corresponding rotor angle change signal 35.

As shown in FIG. 3, the angle computation angle unit 20 can comprise a steady state angle module 62. The steady state angle module 62 is configured to determine the steady state rotor angle $\delta_{e-pcc,ss}$. The steady state rotor angle $\delta_{e-pcc,ss}$ is determined as the sum of the steady state load angle $\delta_{e-t,ss}$ and the voltage angle difference $\delta_{t-pcc,ss}$ between the output terminal 15 and the PCC terminal 17.

Any method can be used to determine the steady state load angle $\delta_{e-t,ss}$. For example, as indicated in FIG. 3, the steady state load angle $\delta_{e-t,ss}$ can be estimated based on the generator output voltage $V_t$ and the generator terminal current $I_t$. The steady state load angle $\delta_{e-t,ss}$ can be estimated using the formula as described in D. Sumina, "Synchronous Generator Load Angle Measurement and Estimation". In the equation shown in FIG. 3, $X_q$ represents the quadrature-axis synchronous reactance and $R_s$ represents the stator resistance. Meanwhile, cos⁡t) is equal to P and sin⁡θ is equal to Q in a PQ-diagram of the synchronous generator 11.

For the purpose of determining the steady state load angle, the generator output voltage $V_t$ and the generator terminal current $I_t$ may be time synchronised samples that are input to the angle computation unit 20. A steady state load angle signal 38 is produced as an intermediary for determining the steady state rotor angle $\delta_{e\text{-}pcc,ss}$.

The steady state angle module 62 is configured to determine the voltage angle difference $\delta_{e\text{-}pcc,ss}$ between the output terminal 15 and the PCC terminal 17. The generator output voltage $V_t$ and the PCC voltage $V_{pcc}$ may be time synchronised samples that are input to the angle computation unit 20. As shown in FIG. 3, the steady state angle module 62 can comprise a phase locked loop 65. The phase locked loop 65 is configured to determine the voltage angle difference $\delta_{e\text{-}pcc,ss}$ between the output terminal 15 and the PCC terminal 17 based on the generator output voltage $V_t$ and the PCC voltage $V_{pcc}$. The phase locked loop 65 is configured to output a corresponding steady state voltage angle difference signal 34.

The steady state angle module 62 is configured to sum the steady state voltage angle difference signal 34 and the steady state load angle signal 38 so as to determine the steady state rotor angle. A corresponding steady state rotor angle signal 33 is produced.

As shown in FIG. 3, the steady state angle module 62 can comprise a sample and hold circuit 66. The sample and hold circuit 66 is configured to sample the steady state rotor angle $\delta_{e\text{-}pcc,ss}$ and hold its value for the transient period.

As shown in FIG. 3, the angle computation unit 20 can comprise a trigger circuit 63. The trigger circuit 63 is configured to output control signals 32 to the sample and hold circuit 66 based on a rate of change of the angular speed of the rotor |a|.

The control of the sample and hold function is determined by the change of the generator speed $\omega_{gen}$ (i.e. the angular speed of the rotor $\omega_{gen}$ of the generator 11). When a fault or disturbance occurs, the unbalanced power causes acceleration of the rotor. The acceleration of the rotor is based on the change of the generator speed signal 21. An acceleration signal 39 is produced. The absolute magnitude of the acceleration |a| is then used as the switching criterion to control the trigger switching. The trigger circuit can be a Schmitt trigger circuit. The thresholds for the Schmitt trigger switching can be adjusted according to the system performance.

The angle computation unit 20 is configured to combine the rotor angle change signal 35 with a preliminary rotor angle signal 31 so as to estimate the overall rotor angle δ. The angle computation unit 20 is configured to output a corresponding rotor angle signal 30. The preliminary rotor angle signal 31 depends on the trigger switching. During a steady state condition, the continuously monitored steady state rotor angle $\delta_{e\text{-}pcc,ss}$ is used as the preliminary rotor angle signal 31. The change of rotor angle Δδ is about zero, such that the overall rotor angle δ is about the same as the continuously monitored steady state rotor angle $\delta_{e\text{-}pcc,ss}$.

When a fault occurs such that a transient period starts, the sample and hold circuit 66 is controlled to hold the value of the steady state rotor angle $\delta_{e\text{-}pcc,ss}$. During the transient period, the held value is used as the preliminary rotor angle signal 31. The change in rotor angle Δδ is non-zero and is used to estimate the overall rotor angle δ during the transient period.

As depicted in FIG. 3, the rotor angle change module 61 can comprise a generator speed estimator 50. The generator speed estimator 50 is configured to estimate the angular speed of the rotor $\omega_{gen}$ of the generator 11. In the case of engine generating systems, it is possible that the angular speed of the rotor $\omega_{gen}$ cannot be measured. However, the corresponding speed of the engine $\omega_{gen}$ can be measured. The generator speed estimator 50 is configured to estimate the angular speed of the rotor $\omega_{gen}$ based on the measured engine speed $\omega_{gen}$. The generator speed estimator 15 receives an engine speed signal 210. As shown in FIGS. 1 and 2, the engine speed signal 210 is measured from the engine 12.

Figure 4:
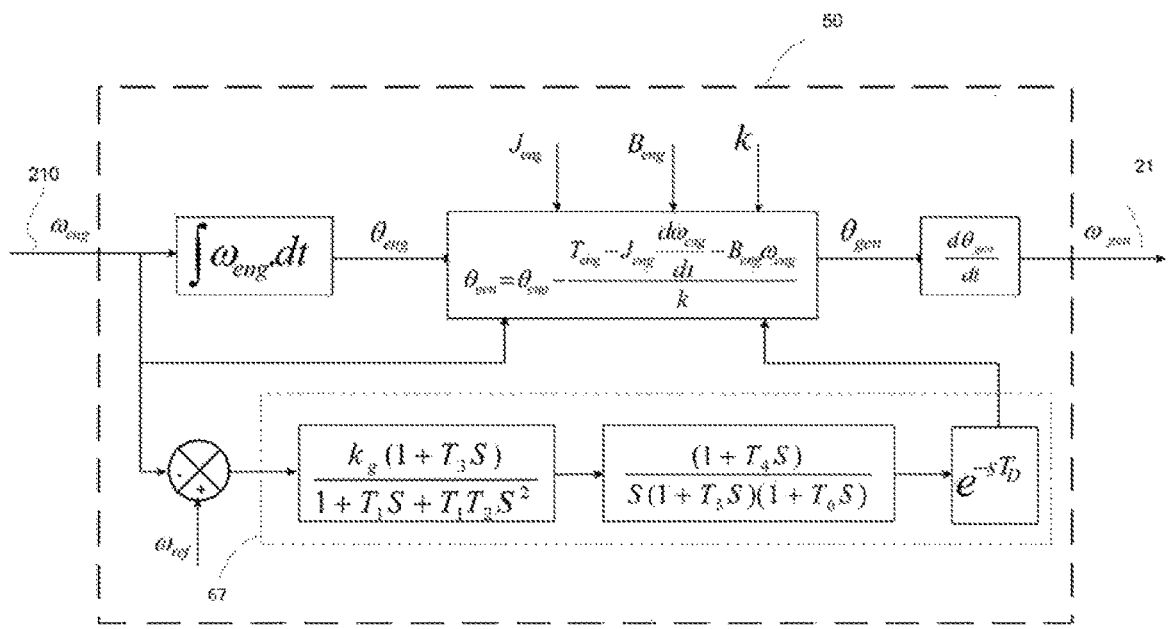
FIG. 4 shows how an angular speed of the rotor can be estimated according to an embodiment.

FIG. 4 is a schematic diagram showing how the generator speed estimator 50 can estimate the angular speed of the rotor $\omega_{gen}$. As shown in FIG. 4, the generator speed estimator 50 can use an engine governor model 67. In the functions shown in FIG. 4, $T_{eng}$ represents the engine torque, $B_{eng}$ represents the engine damping coefficient, $\theta_{eng}$ represents the engine rotor angle, $J_{eng}$ represents the engine moment of inertia, $T_{elect}$ represents the electrical torque, $B_{gen}$ represents the alternator damping coefficient, $\theta_{gen}$ represents the alternator rotor angle, $J_{gen}$ represents the alternator moment of inertia and k represents the torsional stiffness of the coupling.

Figure 5:
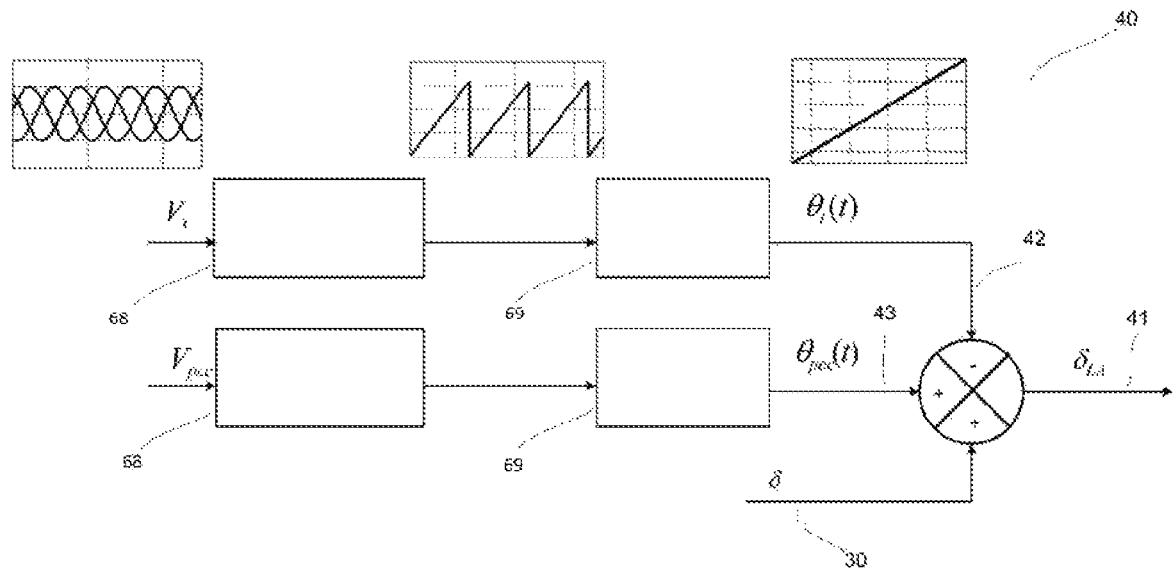
FIG. 5 shows how a load angle can be estimated according to an embodiment.

The description above relates to the determination of the rotor angle δ. It may be desirable to determine the load angle $\delta_{LA}$ for protection or monitoring purposes. FIG. 5 schematically depicts functions of a load angle computation unit 40. The load angle computation unit 40 may be combined together with the angle computation unit 20 as a single computing device 20, 40.

The angle computation unit 40 can be configured to estimate a load angle $\delta_{LA}$ in the transient period based on the estimated rotor angle δ and the difference between a voltage angle $\theta_t(t)$ at the output terminal 15 and a voltage angle $\theta_{pcc}(t)$ at the PCC terminal 17.

The terminal voltage sensor 22 is configured to measure the voltage at the output terminal 15. The PCC voltage sensor 22 is configured to measure a voltage at the PCC terminal 17. The generator output voltage $V_t$ and the PCC voltage $V_{pcc}$ may be time synchronised samples that are input to angle computation unit 40. The angle computation unit 40 is configured to receive a three phrase voltage from the terminal voltage sensor 22, and to determine the voltage angle $\theta_t(t)$ at the output terminal 15. The angle computation unit 40 is configured to receive a three phrase voltage from the PCC voltage sensor 22, and to determine the voltage angle $\omega_{pcc}(t)$ at the PCC terminal 17.

As depicted in FIG. 5, the angle computation unit 40 can comprise one or more space vector angle computation units 68 and one or more angle cumulative linearization units 69. The measured three-phrase voltage at the output terminal 15 and the PCC terminal 17 are fed into the space vector angle computation units 68 to compute the instantaneous voltage angles. The instantaneous angles are then linearized using the angle cumulative linearization units 69 to compute the linearized instantaneous angles $\theta_t(t)$, $\theta_{pcc}(t)$. An output voltage angle signal 42 and a PCC voltage angle signal 43 are thus produced. The angle computation unit 40 is configured to output a load angle single 41 based on the rotor angle signal 30, the output voltage angle signal 42 and the PCC voltage angle signal 43. The load angle $\delta_{LA}$ is computed based on the following equation: $\delta_{LA}=\delta-(\theta_t(t)-\theta_{pcc}(t))$.

An alternative approach for estimating the load angle $\delta_{LA}$ is described below. As described above, the angle computation unit 20 can be configured to determine the steady state load angle $\delta_{e\text{-}t,ss}$ in a steady state period of the generator 11. The angle computation unit 20 is also configured to determine a change in rotor angle Δδ in a transient period. As will be described in more detail with reference to FIG. 6 below, the angle computation unit 40 can be configured to estimate the load angle $\delta_{LA}$ in the transient period based on the change in rotor angle $\Delta\delta$, the steady state load angle $\delta_{e-t,ss}$ and a voltage angle $\theta_t(t)$ at the output terminal 15. In this approach, the load angle $\delta_{LA}$ is estimated using the voltage measurement $V_t$ at the generator output terminal 15 and without the angle information from the voltage measurement at the PCC terminal 17.

Figure 6:
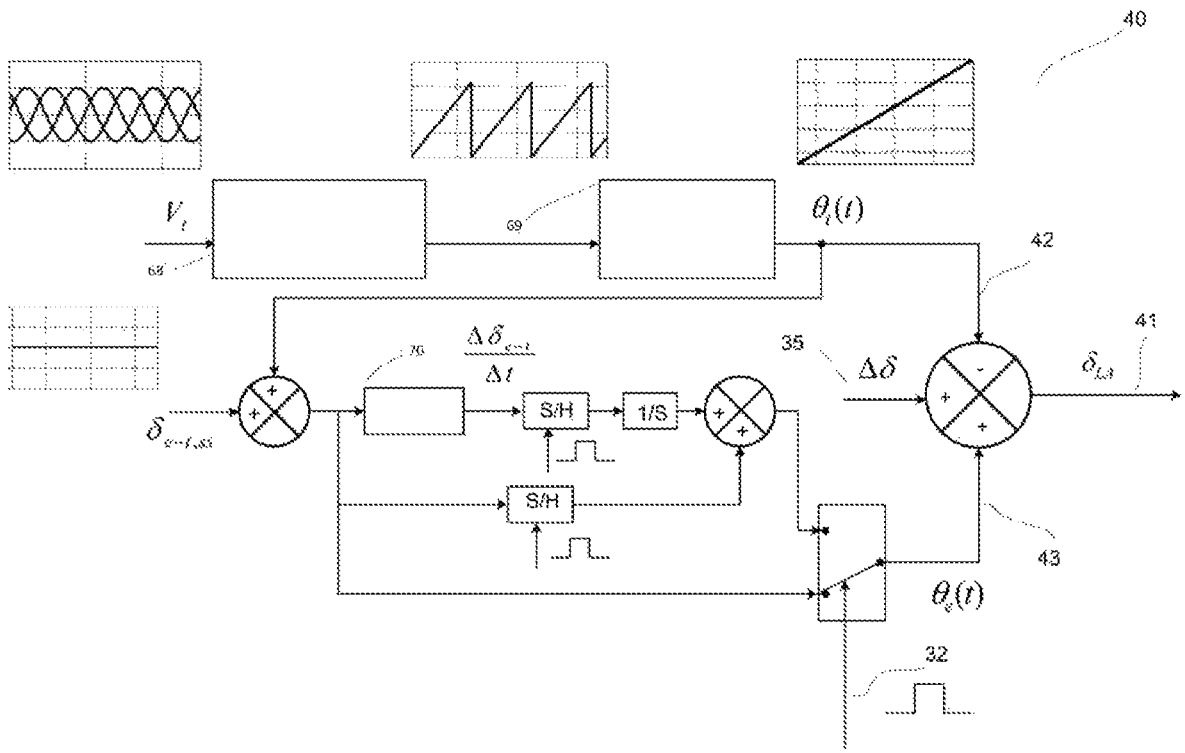
FIG. 6 shows how a load angle can be estimated according to an alternative embodiment.

As shown in FIG. 6, in a steady state condition, the generator terminal voltage $V_t$ is input to a space vector angle computation unit 68 to compute the instantaneous voltage angle. The instantaneous voltage angle is then linearized through an angle cumulative linearization unit 69 to obtain the instantaneous voltage angle $\theta_t(t)$. An output voltage angle signal 42 is thus produced (similar to as shown in FIG. 5). The instantaneous voltage angle $\theta_t(t)$ is then summed with the estimated steady state load angle $\delta_{e-t,ss}$ to obtain the internal voltage instantaneous angle $\theta_e(t)$.

The angle computation 40 can be configured to estimate an internal voltage angle $\theta_e(t)$ of the generator 11 in the transient period based on the steady state load angle $\delta_{e-t,ss}$ and the voltage angle $\theta_t(t)$ at the output terminal 15. The angle computation unit 40 can be configured to estimate the load angle $\delta_{LA}$ in the transient period by determining a difference between the estimated internal voltage angle $\theta_e(t)$ and the voltage angle $\theta_t(t)$ at the output terminal 15.

As will be explained in more detail below, the angle computation unit 40 can be configured to estimate the internal voltage angle $\theta_e(t)$ based on a held value of the internal voltage angle $\theta_e(t)$ from when the transient period started and a gradient of the voltage angle $\theta_t(t)$ at the output terminal 15 when the transient period started. In the event of a fault, the gradient of the voltage angle $\theta_t(t)$ at the output terminal 15 is computed. For example, as shown in FIG. 6 the angle computation unit 40 can comprise a gradient circuit 70 configured to compute the gradient of the voltage angle $\theta_t(t)$ at the output terminal 15. Just right after the fault, the gradient of the voltage angle $\theta_t(t)$ is held and integrated to produce a linearly increased instantaneous angle during the transient period. At the same time, the instantaneous voltage angle $\theta_e(t)$ is held as a constant as well. Then the internal angle during the transient period can be estimated by the sum of the increased angle and the pre-fault angle.

The load angle is computed using the following formula:
$\delta_{LA} = (\theta_e(t) - \theta_t(t)) + \Delta\delta$ In steady state, the change in rotor angle $\Delta\delta$ is about zero and $\theta_e(t) = \delta_{e-t,ss} + \theta_t(t)$ so the equation can be rewritten as follows: $\delta_{LA}(\theta_e(t) - \theta_t(t)) = \delta_{e-t,ss}$.

Using the approach based upon voltage angles, the rotor and/or load angle can still be computed with accuracy in transient periods. Meanwhile the rotor and/or load angle can be calculated automatically in the steady state periods with the same system.

Figure 7:
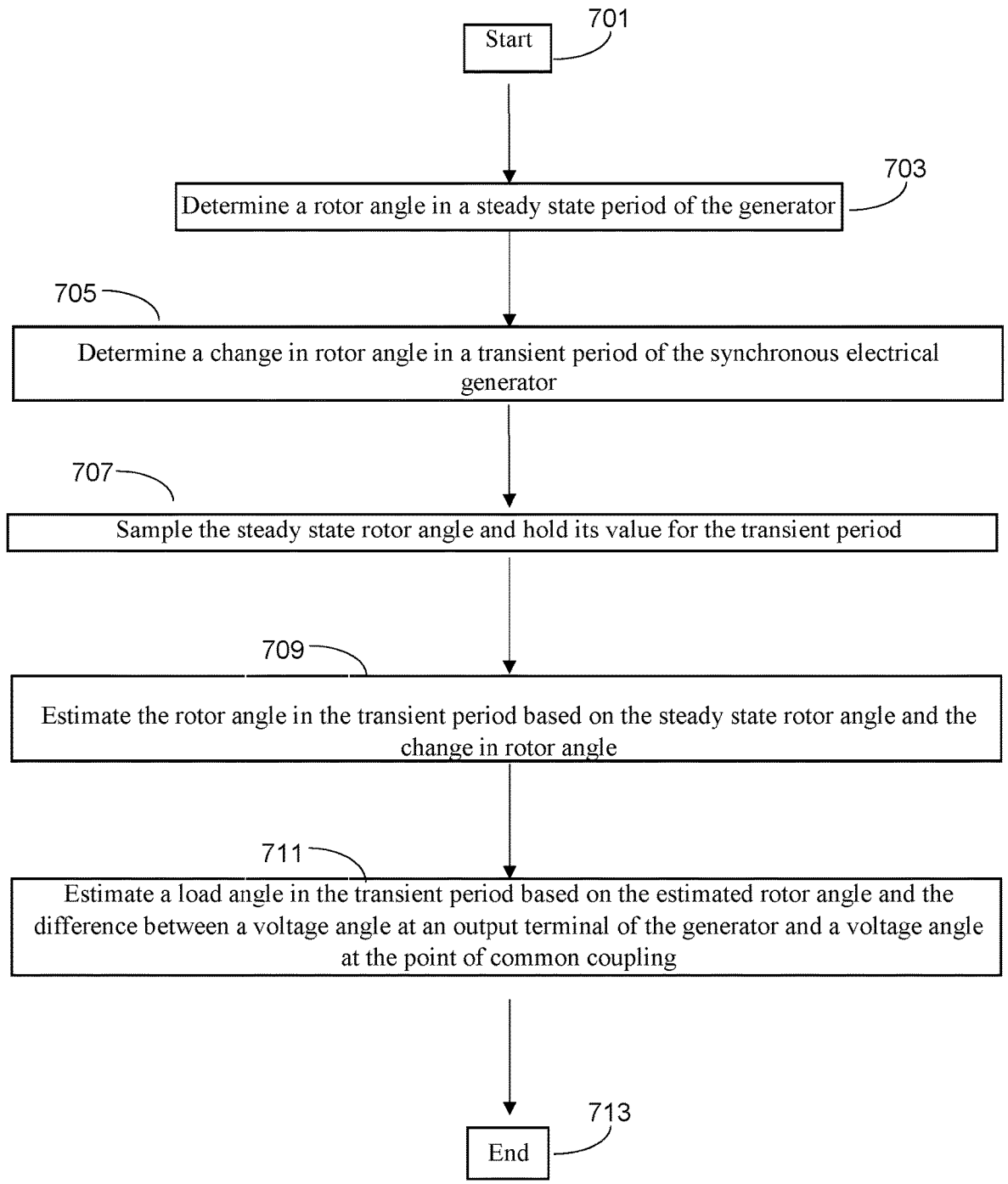
FIG. 7 is a flowchart of a process according to an embodiment.

FIG. 7 is a flow chart of a process, according to the present disclosure, of determining a rotor angle and optionally also a load angle of the power system 10. In step 501, the process begins.

In step 503, the rotor angle in a steady state period of the generator 11 is determined.

In step 505, the change in rotor angle in a transient period of the generator 11 is determined. The ordering of step 503 and step 505 is not important. Step 503 and step 505 may be performed continuously.

In step 507, the sample and hold circuit 66 holds the value of the steady state rotor angle for the transient period. This is based on control signals 32 received from the trigger circuit 63 (i.e. because the acceleration of the rotor is above a certain threshold).

In step 509, the rotor angle is estimated based on the steady state rotor angle and the change in rotor angle.

In step 511, the load angle is estimated based on the estimated rotor angle and the difference between a voltage angle at the output terminal 15 of the generator 11 and a voltage angle at the PCC terminal 17.

In step 513, the process ends.

Figure 8:
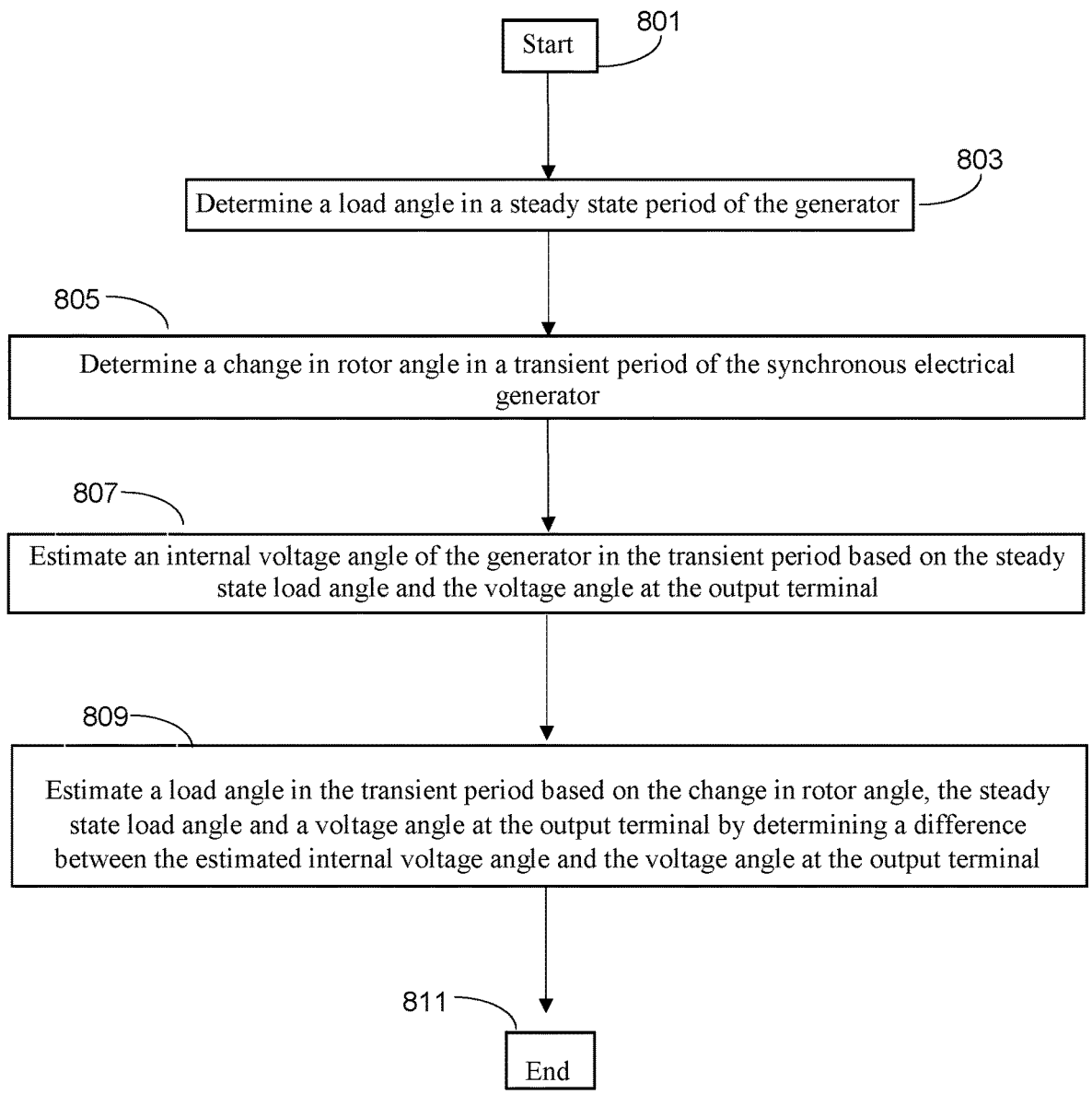
FIG. 8 is a flowchart of a process according to an alternative embodiment.

FIG. 8 is a flow chart of a process, according to the present disclosure, of an alternative approach of determining a load angle of the power system 10.

In step 801, the process begins.

In step 803, the load angle in a steady state period of the generator 11 is determined.

In step 805, the change in rotor angle in a transient period of the generator 11 is determined. The ordering of step 803 and step 805 is not important. Step 803 and step 805 may be performed continuously.

In step 807, the internal voltage angle of the generator 11 is estimated based on the steady state load angle and the voltage angle at the output terminal 15.

In step 809, the load angle in the transient period is estimated based on the change in rotor angle, the steady state load angle and a voltage angle at the output terminal by determining a difference between the estimated internal voltage angle and the voltage angle at the output terminal 15.

In step 811, the process ends.

Embodiments include a number of modifications and variations to the techniques as described above.

For example, it is not necessary for the computing device 20, 40 to be comprised by the power system 10 and the computing device 20, 40 may alternatively be remote from the power system 10 with the required data for calculating the rotor angle or load angle transmitted to the remote computing device 20, 40.

Embodiments are particularly appropriate for determining the rotor angle or load angle of a small generator 11 that supplies electrical power to a power grid 19, such as a smart grid or a micro grid. However, embodiments can be used to determine the rotor angle of any size of generator 11. Embodiments may also be used in other applications and with other types synchronous drives and prime movers (e.g. mechanical drive systems such as engines).

The determination of a rotor angle or load angle is described throughout embodiments. The determination of the rotor angle or load angle may alternatively be considered to be an estimation of the rotor angle or load angle.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A power system, comprising:
a synchronous electrical generator having a rotor; and
an angle computation unit configured to:
    determine a rotor angle in a steady state period of the synchronous electrical generator,
    determine a change in rotor angle in a transient period of the synchronous electrical generator, and estimate the rotor angle in the transient period based on the steady state rotor angle and the change in rotor angle.

2. The power system according to claim 1, wherein the angle computation unit is configured to estimate a load angle in the transient period based on the estimated rotor angle and a difference between a voltage angle at an output terminal of the synchronous electrical generator and a voltage angle at a point of common coupling to a load attached to the synchronous electrical generator.

3. The power system according to claim 2, comprising:
a PCC voltage sensor configured to measure a voltage at the point of common coupling,
wherein the angle computation unit is configured to receive a three phase voltage from the PCC voltage sensor, and determine the voltage angle at the point of common coupling.

4. The power system according to claim 2, comprising:
a terminal voltage sensor configured to measure a voltage at the output terminal,
wherein the angle computation unit is configured to receive a three phase voltage from the terminal voltage sensor, and determine the voltage angle at the output terminal.

5. The power system according to claim 1, wherein the angle computation unit comprises a sample and hold circuit configured to sample the steady state rotor angle and hold its value for the transient period.

6. The power system according to claim 5, wherein the angle computation unit comprises a trigger circuit configured to output control signals to the sample and hold circuit based on a rate of change of an angular speed of the rotor.

7. The power system according to claim 6, comprising:
an prime mover configured to drive the synchronous electrical generator,
wherein the angle computation unit comprises a generator speed estimator configured to estimate the angular speed of the rotor based on an angular speed of the prime mover.

8. The power system according to claim 1, wherein the angle computation unit is configured to determine the change in rotor angle by time integrating differences between an angular speed of the rotor and a reference angular speed.

9. The power system according to claim 1, wherein an electrical power output from the synchronous electrical generator is less than 30 MW.

10. A power system, comprising:
a synchronous electrical generator having a rotor and an output terminal; and
an angle computation unit configured to:
determine a load angle in a steady state period of the synchronous electrical generator,
determine a change in rotor angle in a transient period of the synchronous electrical generator, and
estimate a load angle in the transient period based on the change in rotor angle, the steady state load angle and a voltage angle at the output terminal.

11. The power system according to claim 10, wherein the angle computation unit is configured to:
estimate an internal voltage angle of the synchronous electrical generator in the transient period based on the steady state load angle and the voltage angle at the output terminal, and
estimate the load angle in the transient period by determining a difference between the estimated internal voltage angle and the voltage angle at the output terminal.

12. The power system according to claim 11, wherein the angle computation unit is configured to estimate the internal voltage angle based on a held value of the internal voltage angle from when the transient period started and a gradient of the voltage angle at the output terminal when the transient period started.

13. A computing device configured to determine a rotor angle and/or a load angle in a power system and/or an out-of-step condition by executing a computer program that causes the computing device to perform a method of determining a rotor angle in a power system comprising a synchronous electrical generator, the method comprising:
determining a rotor angle in a steady state period of the synchronous electrical generator;
determining a change in rotor angle in a transient period of the synchronous electrical generator; and
estimating the rotor angle in the transient period based on the steady state rotor angle and the change in rotor angle.

* * * * *